US010255657B2

(12) United States Patent
Chen et al.

(10) Patent No.: US 10,255,657 B2
(45) Date of Patent: Apr. 9, 2019

(54) IMAGE PERSPECTIVE CONVERSION METHOD BY CONVERTING COORDINATES OF POLYGONAL SUB-REGIONS AND SYSTEM THEREOF

(71) Applicant: WELTREND SEMICONDUCTOR INC., Hsinchu (TW)

(72) Inventors: Hsuan-Ying Chen, Hsinchu (TW); Hung-Chih Chiang, Hsinchu (TW); Shui-Chin Yeh, Hsinchu (TW); Chi-Cheng Cheng, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 15/717,949

(22) Filed: Sep. 28, 2017

(65) Prior Publication Data
US 2018/0322610 A1 Nov. 8, 2018

(30) Foreign Application Priority Data

May 8, 2017 (TW) .............................. 106115089 A (51) Int. Cl.
| G06T 3/00 | (2006.01) |
| G06T 3/40 | (2006.01) |
| G06T 19/00 | (2011.01) |
| G09G 5/06 | (2006.01) |
| H04N 1/60 | (2006.01) |

(52) U.S. Cl.
CPC .................................. G06T 3/0056 (2013.01)

(58) Field of Classification Search
USPC ....................................................... 345/607
See application file for complete search history.

(56) References Cited

U.S. PATENT DOCUMENTS

| 2007/0273692 | A1* | 11/2007 | Woo ...................... G06T 15/80 |
| | | | 345/427 |
| 2008/0181488 | A1 | 7/2008 | Ishii |
| 2009/0163775 | A1* | 6/2009 | Barrett ............... A61B 5/14553 |
| | | | 600/301 |
| 2010/0111440 | A1 | 5/2010 | Chai |
| 2010/0201833 | A1 | 8/2010 | Kamiya |
| 2012/0114262 | A1* | 5/2012 | Yu ........................... G06T 5/006 |
| | | | 382/254 |
| 2013/0113876 | A1* | 5/2013 | Zhao ....................... H04N 7/15 |
| | | | 348/38 |

FOREIGN PATENT DOCUMENTS

| CN | 101755285 A | 6/2010 |
| CN | 101938635 A | 1/2011 |
| CN | 103182984 A | 7/2013 |

(Continued)

*Primary Examiner* — Wesner Sajous
(74) *Attorney, Agent, or Firm* — Winston Hsu (57) ABSTRACT

An image perspective conversion method includes acquiring a first image, partitioning a predetermined region on the first image into a plurality of polygonal sub-regions, acquiring a plurality of first coordinates corresponding to the plurality of polygonal sub-regions, converting the plurality of first coordinates into a plurality of second coordinates according to a world coordinate system, and interpolating a plurality of pixels among the plurality of second coordinates for generating a second image.

10 Claims, 6 Drawing Sheets

(56) References Cited

FOREIGN PATENT DOCUMENTS

| | | |
|---|---|---|
| TW | 201121313 A1 | 6/2011 |
| TW | 201220828 A1 | 5/2012 |
| TW | 201226237 A1 | 7/2012 |
| TW | 201309515 A1 | 3/2013 |
| TW | 201537510 A | 10/2015 |

* cited by examiner

IMAGE PERSPECTIVE CONVERSION METHOD BY CONVERTING COORDINATES OF POLYGONAL SUB-REGIONS AND SYSTEM THEREOF

BACKGROUND OF THE INVENTION

1. Field of the Invention

The present invention illustrates an image perspective conversion method, and more particularly, an image perspective conversion method by converting coordinates of polygonal sub-regions.

2. Description of the Prior Art

With advancements of techniques, various image monitoring devices and image recognition systems are popularly adopted in our daily life. The image monitoring devices and the image recognition systems can perform various operations for monitoring an object, monitoring surrounding environment, or recording event data by using at least one camera lens or image capturing device. For example, a dashboard camera disposed inside a vehicle can record image data or continuously capture images around the vehicle by using at least one lens.

In general, a lens of the image monitoring device can be disposed at any position. However, since the lens can be disposed at any position, a distance or an angle between the lens and ground may be changed with respect to the position of the lens. When an image is captured by using the lens, the image may be inherently tilted due to a height of the lens, a view angle of the lens, and a position of the lens. For example, when the distance between the lens and ground is equal to a positive value and a focal point of the lens is on the ground, an image plane of the captured image becomes a trapezoid plane with a baseline greater than a topline. In other words, coordinates of the captured image correspond to camera (i.e., lens) coordinates. Thus, axes of the camera coordinates may be tilted based on a position, a height, and a view angle of a charge coupled device (CCD) or a complementary metal-oxide semiconductor (CMOS) of the lens. In order to calibrate camera coordinates of the captured image, the image monitoring device can perform a pixel-by-pixel coordinate calibration process for adjusting the virtual image plane with a specific angle of view.

Currently, several high definition image formats are adopted to the image monitoring device, such as a high definition (HD, 1280 by 720 pixels) image format, a full high definition (FHD, 1920 by 1080 pixels) image format, or an ultra-high definition (UHD, 3840 by 2160 pixels) image format. Since HD, FHD, and UHD based images are generated by numerous pixels, it requires a lot of time to calibrate all pixel coordinates by using the pixel-by-pixel coordinate calibration process in conventional image monitoring device. Further, a large memory capacity is also required to save mapping data of coordinates and data of a lookup table for calibrating all pixel coordinates. In other words, when a high definition image is processed by using the conventional image monitoring device, large memory capacity and long processing time are unavoidable.

SUMMARY OF THE INVENTION

In an embodiment of the present invention, an image perspective conversion method is disclosed. The method comprises acquiring a first image, partitioning a predetermined region on the first image into a plurality of polygonal sub-regions, acquiring a plurality of first coordinates corresponding to the plurality of polygonal sub-regions, converting the plurality of first coordinates into a plurality of second coordinates according to a world coordinate system, and interpolating a plurality of pixels among the plurality of second coordinates for generating a second image. The first image and the second image are two images with different angles of view.

In another embodiment of the present invention, an image perspective conversion system is disclosed. The system comprises an image capturing device, a memory, a processor, and an image output device. The image capturing device is configured to capture a first image. The memory is configured to save data of a world coordinate system. The processor is coupled to the image capturing device and the memory and configured to process the first image. The image output device is coupled to the processor and configured to output a second image. The processor partitions a predetermined region on the first image into a plurality of polygonal sub-regions, acquires a plurality of first coordinates of the plurality of polygonal sub-regions, converts the plurality of first coordinates into a plurality of second coordinates according to the world coordinate system, and interpolates a plurality of pixels among the plurality of second coordinates for generating the second image. The first image and the second image are two images with different angles of view.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
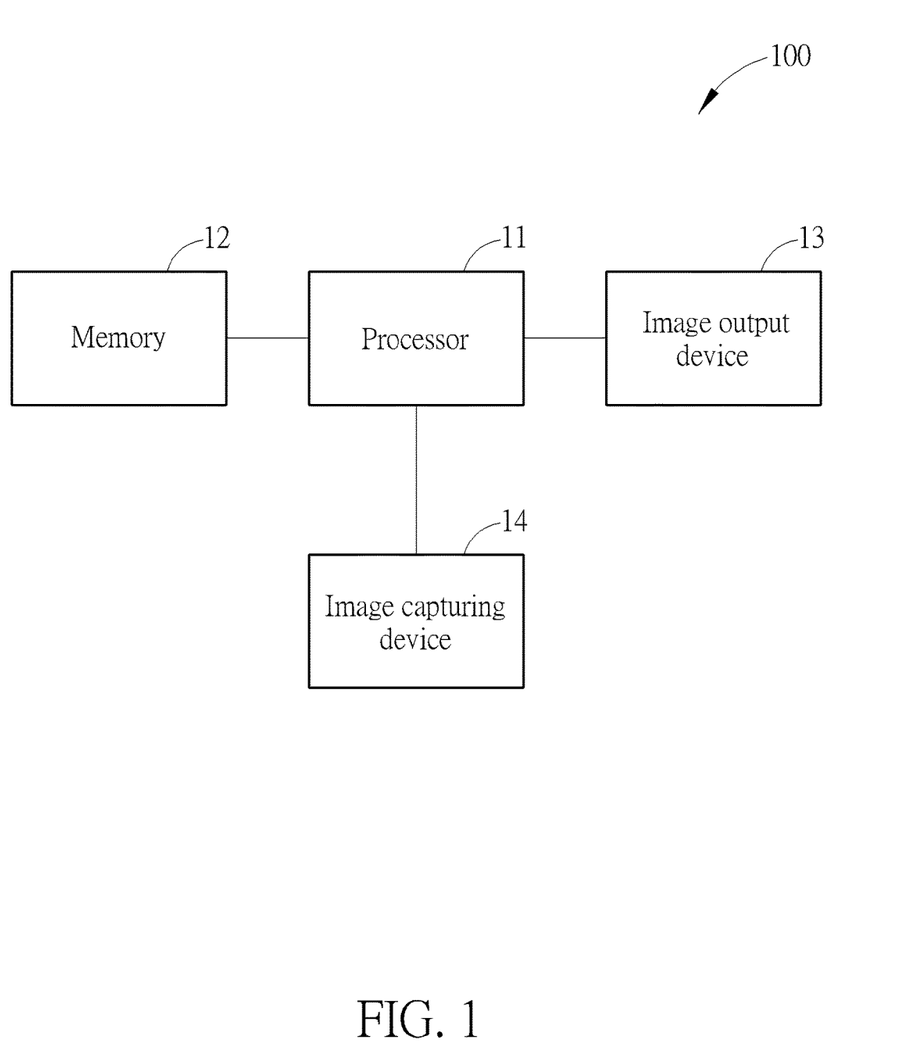
FIG. 1 is a block diagram of an image perspective conversion system according to an embodiment of the present invention.

FIG. 1 is a block diagram of an image perspective conversion system 100 according to an embodiment of the present invention. The image perspective conversion system 100 includes a processor 11, a memory 12, an image output device 13, and an image capturing device 14. The image capturing device 14 is used for capturing a first image. The image capturing device 14 can be a camera lens, a video recorder, or a wide-angle lens of a vehicle. The memory 12 is used for saving data of a world coordinate system and a lookup table. The memory 12 can be any data storage device, such as a random access memory, a hard disc, or a non-volatile memory. The processor 11 is coupled to the image capturing device 14 and the memory 12 for processing the first image captured by the image capturing device 14. The processor 11 can be any data processing device, such as a central processing unit, a micro-processor, a processing chip, or a programmable logic unit. The processor 11 can convert the first image captured by the image capturing device 14 to a second image consistent with virtual image coordinates (i.e., the image with any converted angle of view) by using the world coordinate system and the lookup table saved in the memory 12. The image processing method is illustrated later. The image output device 13 is coupled to the processor 11 for outputting the second image. The image output device 13 can be any display or image projecting device. A user can see the second image with a converted angle of view on the image output device 13.

Figure 2:
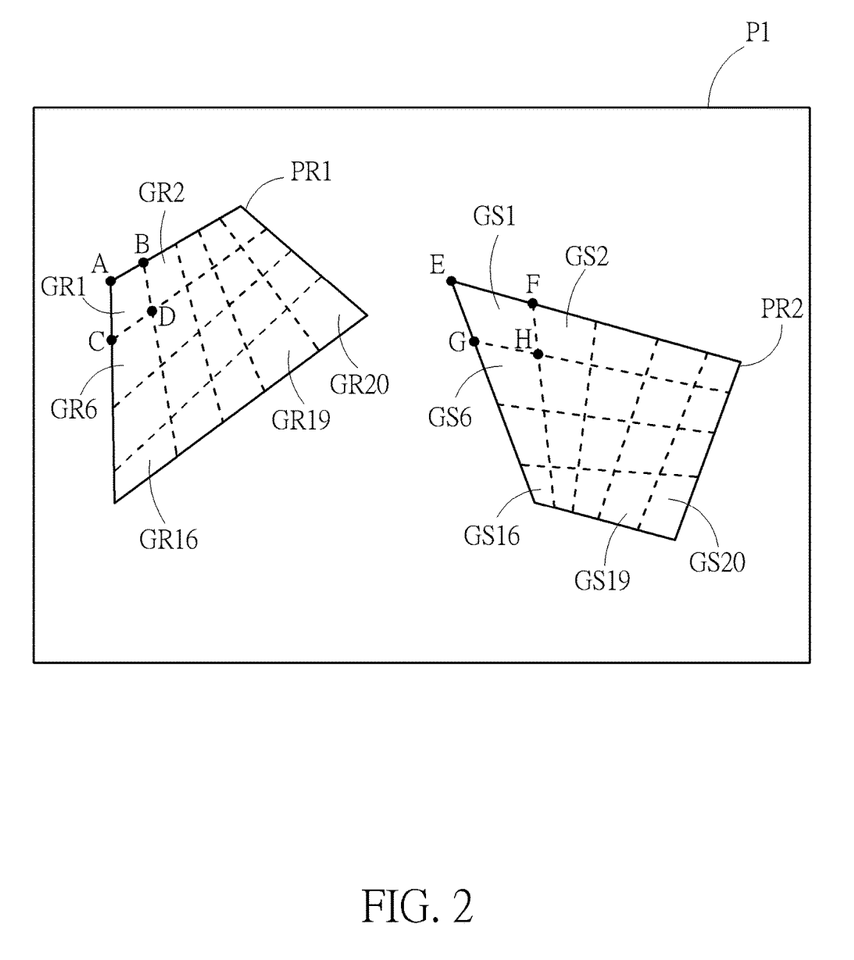
FIG. 2 is an illustration of a first image captured by an image capturing device in the image perspective conversion system in FIG. 1.

FIG. 2 is an illustration of a first image P1 captured by an image capturing device 14 in the image perspective conversion system 100. In the embodiment, the image capturing device 14 can be disposed at any position. Since the image capturing device 14 can be disposed at any position, a distance or an angle between the image capturing device 14 and ground may be changed based on the position of the image capturing device 14. In FIG. 2, when the first image P1 is captured by the image capturing device 14, the first image P1 may be inherently tilted due to a height of the image capturing device 14, a view angle of the image capturing device 14, and a position of the image capturing device 14. For example, when a distance between the image capturing device 14 and ground is equal to a positive value and a focal point of the image capturing device 14 is on the ground, an image plane of the first image P1 becomes a trapezoid plane. In other words, coordinates of the first image P1 correspond to camera (i.e., image capturing device 14) coordinates. Thus, axes of the camera coordinates may be tilted based on a position, a height, and a view angle of a charge coupled device (CCD) or a complementary metal-oxide semiconductor (CMOS) of the image capturing device 14. In FIG. 2, two predetermined regions PR1 and PR2 are introduced to the first image P1. The two predetermined regions PR1 and PR2 can be regarded as two image regions that the user wants to view. Thus, the image perspective conversion system 100 can perform an image process for converting the two predetermined regions PR1 and PR2 with arbitrary angles of view to two image regions corresponding to two regions (say, "two calibrated regions") with converted angles of view. Further, the user can view some objects in the "calibrated" regions. The image processing method of the image perspective conversion system 100 is illustrated below. First, the image perspective conversion system 100 partitions the predetermined regions PR1 and PR2 on the first image P1 into a plurality of polygonal sub-regions. For example, the predetermined region PR1 is partitioned into (4×5) polygonal sub-regions GR1 to GR20. The predetermined region PR2 is partitioned into (4×5) polygonal sub-regions GS1 to GS20. Here, the polygonal sub-regions GR1 to GR20 and the polygonal sub-regions GS1 to GS20 can be quadrilateral sub-regions. However, the present invention is not limited to use quadrilateral sub-regions for partitioning the predetermined region PR1 and the predetermined region PR2. In the embodiment, each polygonal sub-region has a plurality of vertices. For example, the polygonal sub-region GR1 has four vertices. Each vertex has its own first coordinates. Particularly, "coordinates A" is used to present a position of a vertex. Here, the "coordinates" of the vertex can be expressed as pair-wised coordinates on Cartesian coordinate system. For example, coordinates A can be expressed as A(x1,y1). In FIG. 2, the first coordinates A to the first coordinates D correspond to four vertices of the polygonal sub-region GR1. Similarly, the polygonal sub-region GS1 has four vertices. Each vertex has its own first coordinates. In FIG. 2, the first coordinates E to the first coordinates H correspond to four vertices of the polygonal sub-region GS1. As previously mentioned, the first coordinates A to the first coordinates H can be expressed as pair-wised coordinates on Cartesian coordinate system. Here, each polygonal sub-region includes a plurality of pixels. The number of polygonal sub-regions can be a user-defined parameter or a system default parameter.

Figure 3:
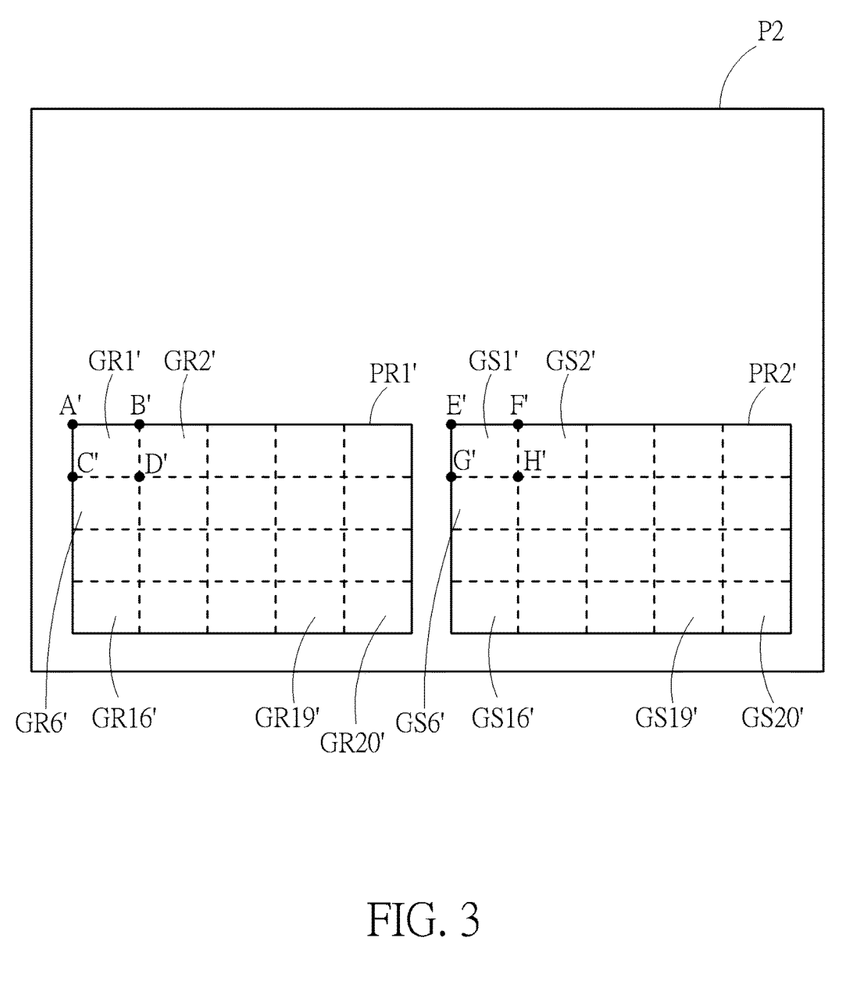
FIG. 3 is an illustration of a second image generated by converting an angle of view of predetermined regions on the first image in the image perspective conversion system in FIG. 1.

FIG. 3 is an illustration of a second image P2 generated by converting an angle of view of predetermined regions PR1 and PR2 on the first image P1 in the image perspective conversion system 100. After the processor 11 generates the polygonal sub-regions GR1 to GR20 and the polygonal sub-regions GS1 to GS20 from the predetermined regions PR1 and PR2, the processor 11 converts the plurality of first coordinates into a plurality of second coordinates according to a world coordinate system. For example, the first coordinates A to the first coordinates D of the polygonal sub-region GR1 of the predetermined regions PR1 of the first image P1 can be respectively converted to second coordinates A' to second coordinates D' of a calibrated polygonal sub-region GR1' of a calibrated region PR1' of the second image P2 in FIG. 3. Specifically, the first coordinates A are converted to the second coordinates A'. The first coordinates B are converted to the second coordinates B'. The first coordinates C are converted to the second coordinates C'. The first coordinates D are converted to the second coordinates D'. Similarly, the first coordinates E to the first coordinates H of the polygonal sub-region GS1 of the predetermined regions PR2 of the first image P1 can be converted to second coordinates E' to second coordinates H' of a calibrated polygonal sub-region GS1' of a calibrated region PR2' of the second image P2 in FIG. 3. Specifically, the first coordinates E are converted to the second coordinates E'. The first coordinates F are converted to the second coordinates F'. The first coordinates G are converted to the second coordinates G'. The first coordinates H are converted to the second coordinates H'. Here, the first coordinates can be regarded as coordinates on the image plane of the camera. The second coordinates can be regarded as coordinates on a virtual image plane with a converted angle of view. The processor 11 can use a homography matrix for numerically converting the first coordinates to the second coordinates. Also, the processor 11 can use a lookup table for directly performing one-to-one coordinate mapping conversion. Any reasonable coordinate conversion method falls into the scope of the present invention. For example, the homography matrix can be saved in a program. The image perspective conversion system 100 can convert coordinates by executing the program. Further, all first coordinates corresponding to polygonal sub-regions (GR1 to GR20) of the predetermined regions PR1 are converted to the second coordinates corresponding to the virtual image plane with a converted angle of view. All first coordinates corresponding to polygonal sub-regions (GS1 to GS20) of the predetermined regions PR2 are converted to the second coordinates corresponding to the virtual image plane with a converted angle of view.

In the following, the processor 11 interpolates a plurality of pixels among the plurality of second coordinates of the polygonal sub-regions GR1 to GR20 and GS1 to GS20 for generating calibrated polygonal sub-regions. For example, after the first coordinates A to D of the polygonal sub-region GR1 in FIG. 2 are converted to the second coordinates A' to D' in FIG. 3, the processor 11 interpolates a plurality of pixels among the second coordinates A' to D' for generating the calibrated polygonal sub-region GR1'. Similarly, after the first coordinates E to H of the polygonal sub-region GS1 in FIG. 2 are converted to the second coordinates E' to H' in FIG. 3, the processor 11 interpolates a plurality of pixels among the second coordinates E' to H' for generating the calibrated polygonal sub-region GS1'. Here, interpolating pixels can be achieved by using a linear interpolation method or a non-linear interpolation method. Any reasonable interpolation method falls into the scope of the present invention. By doing so, the processor 11 can generate all calibrated polygonal sub-regions. Thus, for the predetermined region PR1 with the polygonal sub-regions GR1 to GR20, the predetermined region PR1 becomes the calibrated region PR1' with the calibrated polygonal sub-regions GR1' to GR20' after a coordinate conversion process and a pixel interpolation process are performed. Similarly, for the predetermined region PR2 with the polygonal sub-regions GS1 to GS20, the predetermined region PR2 becomes the calibrated region PR2' with the calibrated polygonal sub-regions GS1' to GS20' after the coordinate conversion process and the pixel interpolation process are performed. The calibrated regions PR1' and PR2' can correspond to two images with a converted angle of view. Also, the calibrated regions PR1' and PR2' can correspond to two images with different angles of view (converted). Thus, the second image P2 can include several images of calibrated regions with respect to several angles of view. In the embodiment, when all predetermined regions of the first image P1 are calibrated, the generated second image P2 can be displayed on the image output device 13.

Figure 4:
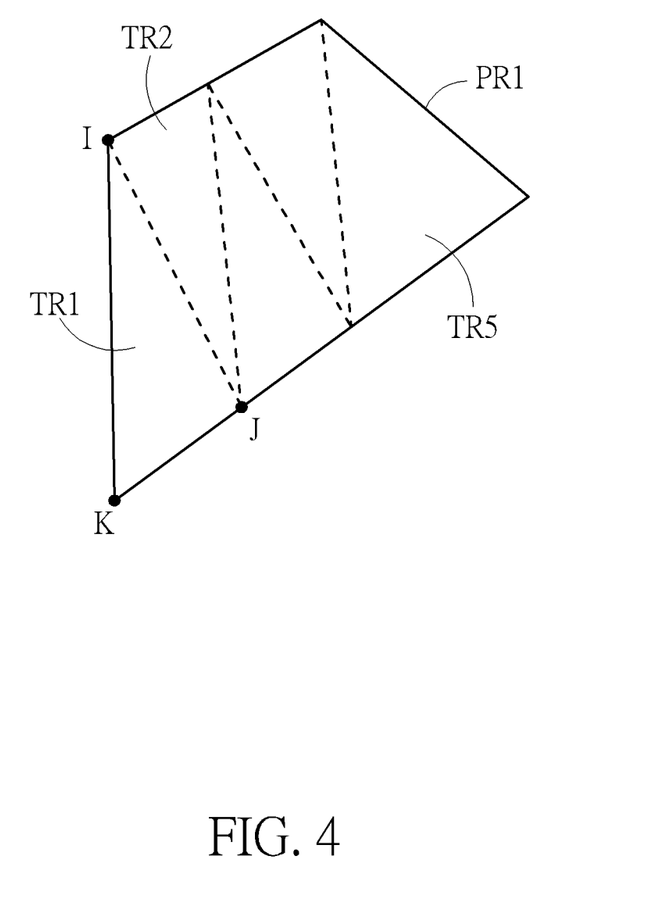
FIG. 4 is an illustration of a predetermined region on the first image partitioned into a plurality of triangular sub-regions for converting the angle of view in the image perspective conversion system in FIG. 1.
Figure 5:
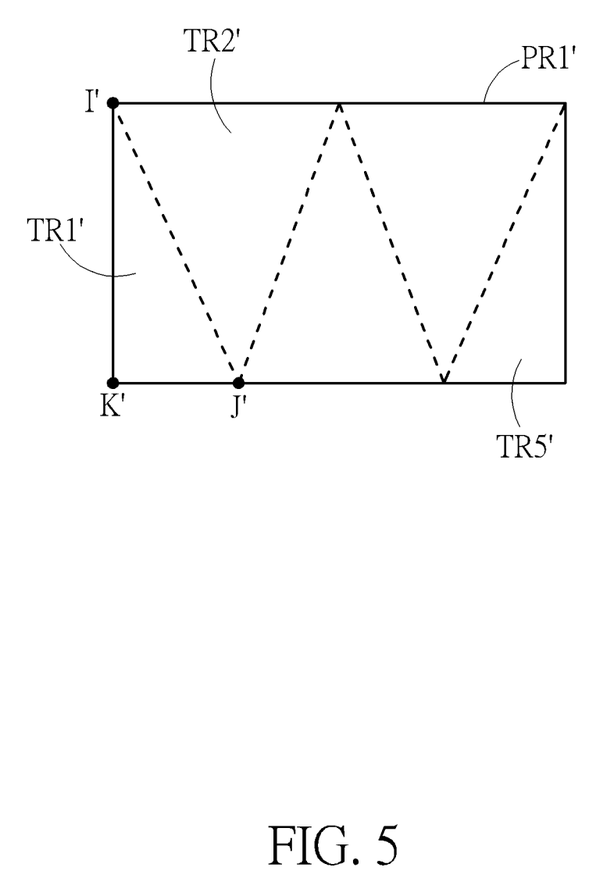
FIG. 5 is an illustration of calibrated coordinates of the plurality of triangular sub-regions in the image perspective conversion system in FIG. 1.

FIG. 4 is an illustration of a predetermined region PR1 on the first image P1 partitioned into a plurality of triangular sub-regions for converting the angle of view in the image perspective conversion system 100. FIG. 5 is an illustration of calibrated coordinates of the plurality of triangular sub-regions in the image perspective conversion system 100. As previously mentioned, any polygonal sub-regions can be used for partitioning the predetermined region PR1 of the first image P1 in order to convert coordinates. The present invention is not limited to use quadrilateral sub-regions for partitioning the predetermined region PR1. For example, in FIG. 4, the polygonal sub-regions TR1 to TR5 can be triangular sub-regions (hereafter, say "triangular sub-regions TR1 to TR5") for partitioning the predetermined region PR1 in order to convert coordinates. Similarly, the first coordinates of vertices of the triangular sub-regions TR1 to TR5 can be converted to the second coordinates according to the world coordinate system. For example, the triangular sub-region TR1 has three vertices, which correspond to coordinates I to coordinates K. The coordinates I to the coordinates K can be converted to the coordinates I' to the coordinates K' respectively in FIG. 5 by using the processor 11. Particularly, the coordinates I are converted to the coordinates I'. The coordinates J are converted to the coordinates J'. The coordinates K are converted to the coordinates K'. After all coordinates (i.e., say, the first coordinates) of the triangular sub-regions TR1 to TR5 are completely converted to the second coordinates, similarly, the processor 11 interpolates a plurality of pixels among the second coordinates for generating a calibrated polygonal sub-region. For example, the first coordinates I to the first coordinates K of the triangular sub-region TR1 can be converted to the second coordinates I' to the second coordinates K' in FIG. 5. Then, the processor 11 interpolates a plurality of pixels among the second coordinates I' to K' for generating the calibrated polygonal sub-region (i.e., say, calibrated triangular sub-region) TR1'. Here, interpolating pixels can be achieved by using a linear interpolation method or a non-linear interpolation method. Any reasonable interpolation method falls into the scope of the present invention. By doing so, the processor 11 can generate all calibrated triangular sub-regions TR1' to TR5'. Thus, for the predetermined region PR1 with the triangular sub-regions TR1 to TR5, the predetermined region PR1 becomes the calibrated region PR1' with the calibrated triangular sub-regions TR1' to TR5' after a coordinate conversion process and a pixel interpolation process are performed. By doing so, the calibrated region PR1' generated by using a triangular sub-region based coordinate conversion method has a virtual image plane with a converted angle of view.

Figure 6:
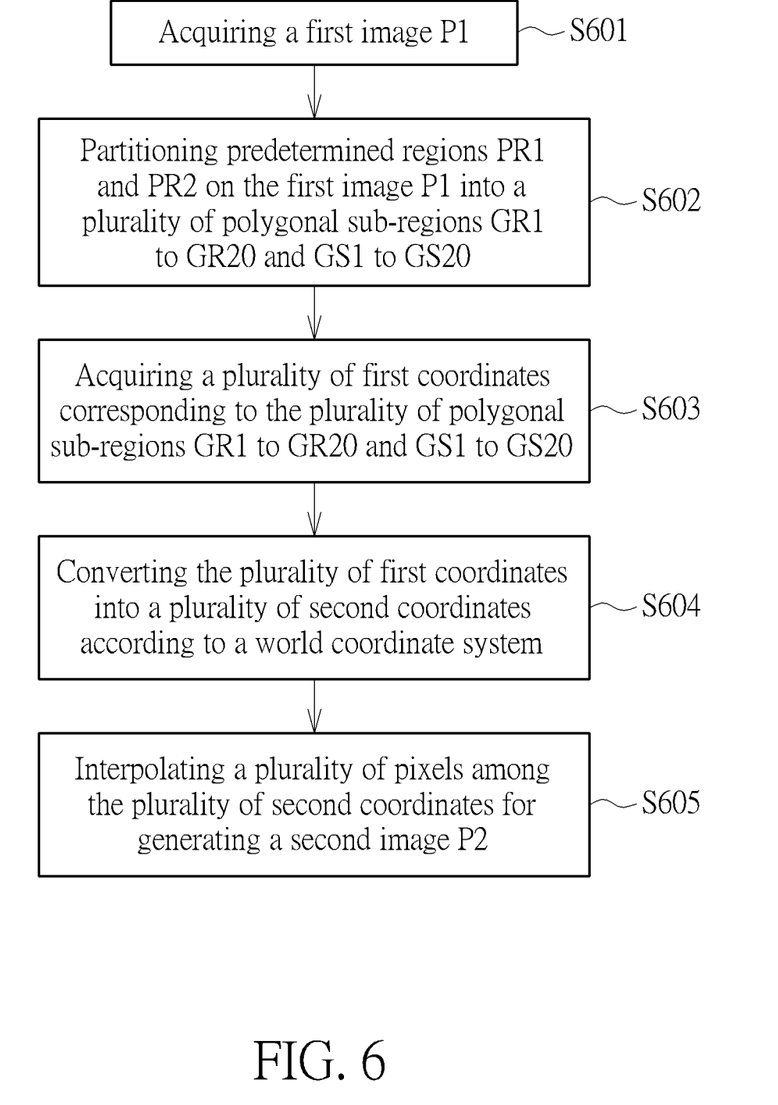
FIG. 6 is a flowchart of an image perspective conversion method by using the image perspective conversion system in FIG. 1.

FIG. 6 is a flowchart of an image perspective conversion method by using the image perspective conversion system 100. The image perspective conversion method includes step S601 to step S605. Any reasonable modification of step S601 to step S605 falls into the scope of the present invention. Step S601 to step S605 are illustrated below.

step S601: acquiring a first image P1;
step S602: partitioning predetermined regions PR1 and PR2 on the first image P1 into a plurality of polygonal sub-regions GR1 to GR20 and GS1 to GS20;
step S603: acquiring a plurality of first coordinates corresponding to the plurality of polygonal sub-regions GR1 to GR20 and GS1 to GS20;
step S604: converting the plurality of first coordinates into a plurality of second coordinates according to a world coordinate system;
step S605: interpolating a plurality of pixels among the plurality of second coordinates for generating a second image P2.

The image perspective conversion method including step S601 to S605 is illustrated previously. Thus, they are omitted here. Although two predetermined regions PR1 and PR2 are introduced to the first image P1 in aforementioned embodiments and then partitioned into several quadrilateral sub-regions or triangular sub-regions for converting coordinates, the present invention is not limited to use specific polygonal sub-regions or specific number of polygonal sub-regions for converting coordinates. For example, the first image P1 can include any number of predetermined regions. Each predetermined region can be partitioned into any number of polygonal sub-regions. In an embodiment, when a single predetermined region of the first image P1 is partitioned into numerous polygonal sub-regions, a second image P2 with a converted angle of view has satisfactory image quality. However, it requires a lot of time and a lot of capacity of the memory 12 for processing the first image P1 by the processor 11. When the single predetermined region of the first image P1 is partitioned into few polygonal sub-regions, a second image P2 with the converted angle of view has poor image quality. However, it requires a short time and a small capacity of the memory 12 for processing the first image P1 by the processor 11. Therefore, the image perspective conversion method in the present invention has high operational flexibility. In other words, a user can optionally choose balanced configurations among hardware requirement, processing speed, and image quality.

To sum up, an image perspective conversion method and an image perspective conversion system are disclosed. The image perspective conversion system can use the image perspective conversion method for converting an angle of view of the predetermined region. Then, the user can see an image with a converted angle of view on the image output device. The image perspective conversion system can partition each predetermined region into several polygonal sub-regions and then change coordinates of each polygonal sub-region. Each polygonal sub-region includes a plurality of pixels. For example, when N polygonal sub-regions are used for partitioning the predetermined region with (1280×720) pixels, each polygonal sub-region has (1280/N) pixels. N can be a user-defined positive value greater than two. When N is large, it implies that a single predetermined region is partitioned into numerous polygonal sub-regions. A converted image with a converted angle of view has satisfactory image quality. However, it requires a lot of time and a lot of capacity of the memory for generating the converted image. When N is small, it implies that the single predetermined region is partitioned into few polygonal sub-regions. A converted image with a converted angle of view has poor image quality. However, it requires a short time and a small capacity of the memory for generating the converted image. Therefore, in the image perspective conversion system of the present invention, a user can appropriately adjust image quality according to the processing speed and hardware specification. Thus, the image perspective conversion method in the present invention has high operational flexibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image perspective conversion method comprising:
   acquiring a first image by a camera;
   the camera generating a data signal of the first image to a processor;
   the processor partitioning a predetermined region on the first image into a plurality of polygonal sub-regions;
   the processor detecting vertices of the plurality of polygonal sub-regions for acquiring a plurality of first coordinates corresponding to the plurality of polygonal sub-regions;
   the processor performing a one-to-one coordinate mapping process for converting the plurality of first coordinates into a plurality of second coordinates according to a world coordinate system; and
   the processor interpolating a plurality of pixels among the plurality of second coordinates for generating a second image;
   wherein the first image and the second image are two images with different angles of view.

2. The method of claim 1, wherein the plurality of first coordinates correspond to a plurality of coordinates on an image plane of a camera, and the plurality of second coordinates correspond to a plurality of coordinates on a virtual image plane.

3. The method of claim 1, wherein each polygonal sub-region comprises a plurality of pixels, and the each polygonal sub-region is a quadrilateral sub-region.

4. The method of claim 1, wherein each polygonal sub-region comprises a plurality of pixels, and the each polygonal sub-region is a triangular sub-region.

5. The method of claim 1, wherein the plurality of first coordinates are a plurality of coordinates corresponding to vertices of the plurality of polygonal sub-regions.

6. The method of claim 1, wherein converting the plurality of first coordinates into the plurality of second coordinates according to the world coordinate system comprises:
   using a homography matrix to convert the plurality of first coordinates into the plurality of second coordinates according to the world coordinate system.

7. The method of claim 1, wherein converting the plurality of first coordinates into the plurality of second coordinates according to the world coordinate system comprises:
   using a lookup table to convert the plurality of first coordinates into the plurality of second coordinates according to the world coordinate system.

8. The method of claim 1, wherein the first image is an image with an arbitrary angle of view, and the second image is an image with a converted angle of view.

9. An image perspective conversion system comprising:
   a camera configured to capture a first image;
   a memory configured to save data of a world coordinate system;
   a processor coupled to the camera and the memory and configured to process the first image; and
   an image output device coupled to the processor and configured to output a second image;
   wherein the camera generates a data signal of the first image to the processor, the processor partitions a predetermined region on the first image into a plurality of polygonal sub-regions, the processor detects vertices of the plurality of polygonal sub-regions for acquiring a plurality of first coordinates of the plurality of polygonal sub-regions, the processor performs a one-to-one coordinate mapping process for converting the plurality of first coordinates into a plurality of second coordinates according to the world coordinate system, and the processor interpolates a plurality of pixels among the plurality of second coordinates for generating the second image, and the first image and the second image are two images with different angles of view.

10. The system of claim 9, wherein the memory has a lookup table configured to convert the plurality of first coordinates into the plurality of second coordinates, and the plurality of first coordinates are a plurality of coordinates of vertices of the plurality of polygonal sub-regions.

* * * * *